United States Patent [19]

Arakawa

[11] Patent Number: 4,573,785
[45] Date of Patent: Mar. 4, 1986

[54] DISPLAY DEVICE FOR FOCUS DETECTING CAMERA

[75] Inventor: Kazuhiko Arakawa, Ohmorini, Japan

[73] Assignee: Canon Kabushiki Kaisha, Tokyo, Japan

[21] Appl. No.: 606,706

[22] Filed: May 3, 1984

[30] Foreign Application Priority Data

May 9, 1983 [JP] Japan .................................. 58-69034

[51] Int. Cl.⁴ ........................................... G03B 13/18
[52] U.S. Cl. ................................................ 354/409
[58] Field of Search ................... 354/401, 409, 195.13, 354/289.1, 289.12, 195.1

[56] References Cited

U.S. PATENT DOCUMENTS

| | | | |
|---|---|---|---|
| 4,288,151 | 9/1981 | Matsumoto et al. | 354/409 |
| 4,319,813 | 3/1982 | Aoki et al. | 354/409 |
| 4,335,942 | 6/1982 | Tsunekawa et al. | 354/409 X |
| 4,361,390 | 11/1982 | Yamada | 354/409 X |
| 4,382,665 | 5/1983 | Eguchi et al. | 354/409 |

FOREIGN PATENT DOCUMENTS 115523 7/1982 Japan .................................. 354/195.1

Primary Examiner—William B. Perkey
Attorney, Agent, or Firm—Toren, McGeady, Stanger, Goldberg & Kiel

[57] ABSTRACT

In the disclosed focus detecting camera, a display is arranged to indicate the drive direction of the camera's photo-taking lens. The camera's focus detecting circuit can detect the in-focus, near-focus, and far-focus positions of the taking lens except when the taking lens is in a drawn out position. The display device shows the drive direction of the lens wherein the display is unable to detect the position.

27 Claims, 16 Drawing Figures

FIG. 6

| SIGNAL \ MODE | WHEN AUTOMATIC FOCUSING LENS IS USED ||||| WHEN MANUAL FOCUSING LENS IS USED |
| | AUTOMATIC FOCUSING | MANUAL + POWER FOCUSING | AIDED FOCUSING + POWER FOCUSING |||  AIDED FOCUSING |
| | | | LENS DRAWN OUT | LENS STOPPED | LENS DRAWN IN | |
| --- | --- | --- | --- | --- | --- | --- |
| FAR-FOCUS | △ | / | △ | △ | △ | △ |
| IN-FOCUS | ○ | / | ☀ (flickers) | ○ | ○ | ○ |
| NEAR-FOCUS | ▽ | / | ▽ | ▽ | ▽ | ▽ |
| UNDETECTABLE — LENS DRAWN OUT | ☀△ (flickers) | ☀△ (flickers) | ☀△ (flickers) | ☀△ (flickers) | ☀△ (flickers) | / |
| UNDETECTABLE — LENS DRAWN IN | ☀▽ (flickers) | ☀▽ (flickers) | / | ☀▽ (flickers) | ☀▽ (flickers) | ☀▽ (flickers) |

Legend: △ : LIGHTS UP   ☀△ : FLICKERS

FIG. 9

| SIGNAL \ MODE | WHEN AUTOMATIC FOCUSING LENS IS USED | | | | | WHEN MANUAL FOCUSING LENS IS USED |
|---|---|---|---|---|---|---|
| | AUTOMATIC FOCUSING | MANUAL+POWER FOCUSING | AIDED FOCUSING +POWER FOCUSING | | | AIDED FOCUSING |
| | | | LENS DRAWN OUT | LENS STOPPED | LENS DRAWN IN | |
| FAR-FOCUS | △ | / | △ | △ | △ | △ |
| IN-FOCUS | ○ | / | ○ | ○ | ○ | ○ |
| NEAR-FOCUS | ▽ | / | ▽ | ▽ | ▽ | ▽ |
| LENS DRAWN OUT | ☆ | ☆ | ☆ | ☆ | ☆ | ☆ |
| UNDETECTABLE LENS DRAWN IN | ▼̇ | ▼̇ | ▼̇ | ▼̇ | ▼̇ | ▼̇ |

( △ : LIGHTS UP / ☆ : FLICKERS )

F I G. 15

| MODE / SIGNAL | LENS DRAWN OUT | WHEN MANUAL FOCUSING LENS IS USED — AIDED FOCUSING | |
|---|---|---|---|
| | | LENS STOPPED | LENS DRAWN IN |
| FAR-FOCUS | △ | △ | △ |
| IN-FOCUS | ☀ | ○ | ○ |
| NEAR-FOCUS | ☀ | ▽ | ▽ |
| UNDETECTABLE — LENS DRAWN OUT | ☀ | ☀ | |
| UNDETECTABLE — LENS DRAWN IN | | ▽ | ▽ |

( △ LIGHTS UP   ☀ FLICKERS )

DISPLAY DEVICE FOR FOCUS DETECTING CAMERA

BACKGROUND OF THE INVENTION

1. Field of the Invention

This invention relates to a focus detecting camera with a display and more particularly to a device which is capable of displaying the direction of the drive of the camera's photo-taking lens.

2. Description of the Prior Art

Known photographic cameras with focus detecting circuits use the computation performed by a focus detecting circuit to determine whether the drawn out or drawn in position of a photo-taking lens is in a near-focus, an in-focus or a far-focus position. Cameras with such conventional focus detecting circuits utilize one of two methods, i.e., a fully automatic method in which the photo-taking lens is automatically driven to shift it toward an in-focus position on the basis of the result of the computation performed by the focus detecting circuit; or a manual method in which the photographer moves the photo-taking lens either manually or by power according to a display indicating a near-focus, in-focus or far-focus state.

Although it varies with the distance measuring method employed for the focus detecting circuit, cameras with conventional focus detecting circuits generally have a limited focus detecting range and are incapable of detecting a focus under various conditions such as when an object to be photographed is dim, when the actual lens position deviates significantly from its in-focus position, when the objects contrast is weak, when the object is composed of a fine repeating pattern, and so on. In such conditions, the operation of the camera varies greatly depending upon the extent of the departure of the actual lens position from the in-focus lens position. At certain drawn out positions of the photo-taking lens, an operation which draws the lens in or out makes it possible for the focus detecting circuit to detect the focus condition as the lens moves closer to the in-focus position even if focus detection is impossible at the initial lens position. Therefore, when automatic focus detection is ordinarily impossible, forcibly driving the photo-taking lens in an arbitrary direction initiates a so-called searching operation which makes focus detection possible.

When a conventional camera with a focus detecting function is in the search mode either nothing is displayed within the viewfinder or a display merely shows that the camera is in the process of searching. Hence, the photographer is unaware of the direction in which the searching operation is drawing the lens in or out. Therefore, even when the photo-taking lens is being shifted away from the focusing direction during the searching process, the photographer is unable to know it. This tends to delay his or her decision to switch the camera to a manual focusing operation mode or to reverse the search direction in order to seize a momentary picture-taking opportunity.

When focusing manually, the photographer drives the photo-taking lens on the basis of a near-focus or far-focus display. In that case, the absence of a display indicating the drive direction of the photo-taking lens compels the photographer to perceive the actual lens drive direction only from the near-focus or far-focus position through the gradual focusing or defocusing of the lens. Therefore, manual focusing has required a long time especially when the lens is being driven away from the focused condition. This has also presented a problem.

SUMMARY OF THE INVENTION

It is an object of the present invention to provde a display device for a focus detecting camera which is arranged to display a photo-taking lens driving direction when the photo-taking lens is driven in a state of having been drawn out to a focus undetectable position, so that a length of time required for focusing in that event can be shortened.

It is another object of the invention to provide a display device for a focus detecting camera arranged to have the photo-taking direction determined by the photographer, wherein a display is made to show whether or not a photo-taking lens is correctly driven in the focusing direction, so that a length of time required for focusing can be shortened.

These and further objects and features of the invention will become apparent from the following detailed description of preferred embodiments thereof taken in conjunction with the accompanying drawings.

BRIEF DESCRIPTION OF THE DRAWINGS

FIG. 6 shows the manners in which view finder displays are made under various photographing modes of the first embodiment.

FIG. 9 shows the manners in which view finer displays are made under various photographing modes of the second embodiment.

FIG. 15 shows the manners in which displays are made within the view finder of the fourth embodiment.

DETAILED DESCRIPTION OF THE PREFERRED EMBODIMENTS

Figure 1:
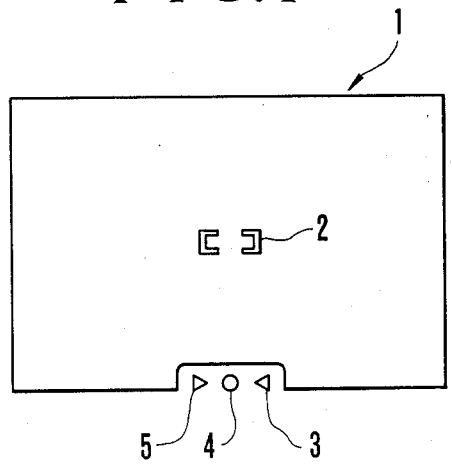
FIG. 1 is an illustration of the view finder field of a focus detecting camera arranged as a first embodiment of this invention.
Figure 2:
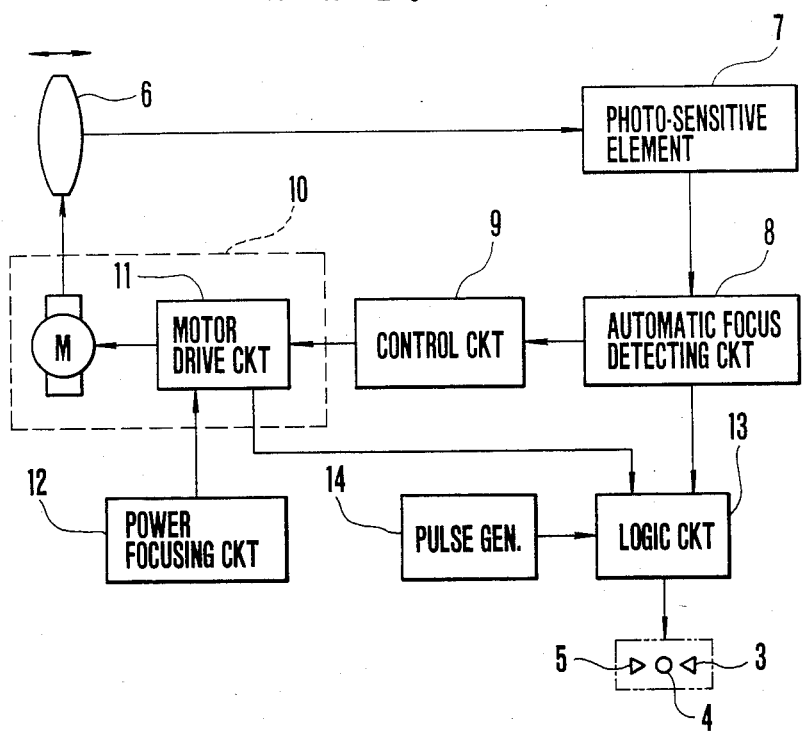
FIG. 2 is a block diagram showing the whole arrangement of the first embodiment.

Among the accompanying drawings which illustrate various embodiments of this invention, FIGS. 1 to 5 show a first embodiment. In FIG. 1, the illustration includes a view finder field 1; a distance measurement mark 2; and display elements 3, 4 and 5 which are arranged to show near-focus, in-focus and far-focus (sometimes referred to as rear-focus) states and photo-taking lens driving directions. The display element 3 is arranged to show a near-focus state by remaining continuously lit without flickering, and to flicker to show that a photo-taking lens is shifting in the draw-in direction during a search process under a power focusing mode. The display element 4 is arranged to show an in-focus state by lighting up. The display element 5 is arranged to show a far-focus state by remaining lit without flickering and also to flicker to show that the photo-taking lens is shifting in the draw-out direction during a search process in the power focusing mode. In FIG. 2, the illustration includes a photo-taking lens 6; a photo-sensitive or light receiving element 7 which is arranged to receive through the photo-taking lens 6 a light from an object to be photographed, to photo-electric convert the light and to supply a photo-electric conversion output thus obtained to an automatic focus detecting circuit 8. The automatic focus detecting circuit 8 which will be further described later is arranged to compute the output of the photo-sensitive element 7 and to supply a logic circuit 13 with a near-focus signal, an in-focus signal, a far-focus signal or a focus undetectable signal which will be described in detail later. The circuit 8 is further arranged to produce a signal to a control circuit 9 indicating the extent of deviation of the actual lens position from an in-focus position of the photo-taking lens. Upon receipt of the signal from the automatic focus detecting circuit 8, the control circuit 9 supplies a lens driving circuit 10 with a motor drive signal representing the direction and extent to which the photo-taking lens 6 must be driven. Further, upon receipt of a focus undetectable signal from the circuit 8, the control circuit 9 supplies the circuit 10 with a motor driving signal of a random direction to cause the circuit 10 to perform a searching process. The lens driving circuit 10 which will be described in detail later consists of a motor drive circuit 11 and a motor M. The motor drive circuit 11 is arranged to effect and cut off power supply to the motor M and to control the rotation and rotating direction of the motor M to obtain a given rotation angle. Further, the lens driving circuit 10 is arranged to supply the logic circuit 13 with a driving direction signal (a lens drawing-in or -out signal). A power focusing circuit 12 is arranged to produce and supply a signal representing the lens driving direction to the lens driving circuit 10 under the power focusing mode. The logic circuit 13 is arranged in a manner as will be described in detail later herein. A reference numeral 14 denotes a pulse generator.

Figure 3:
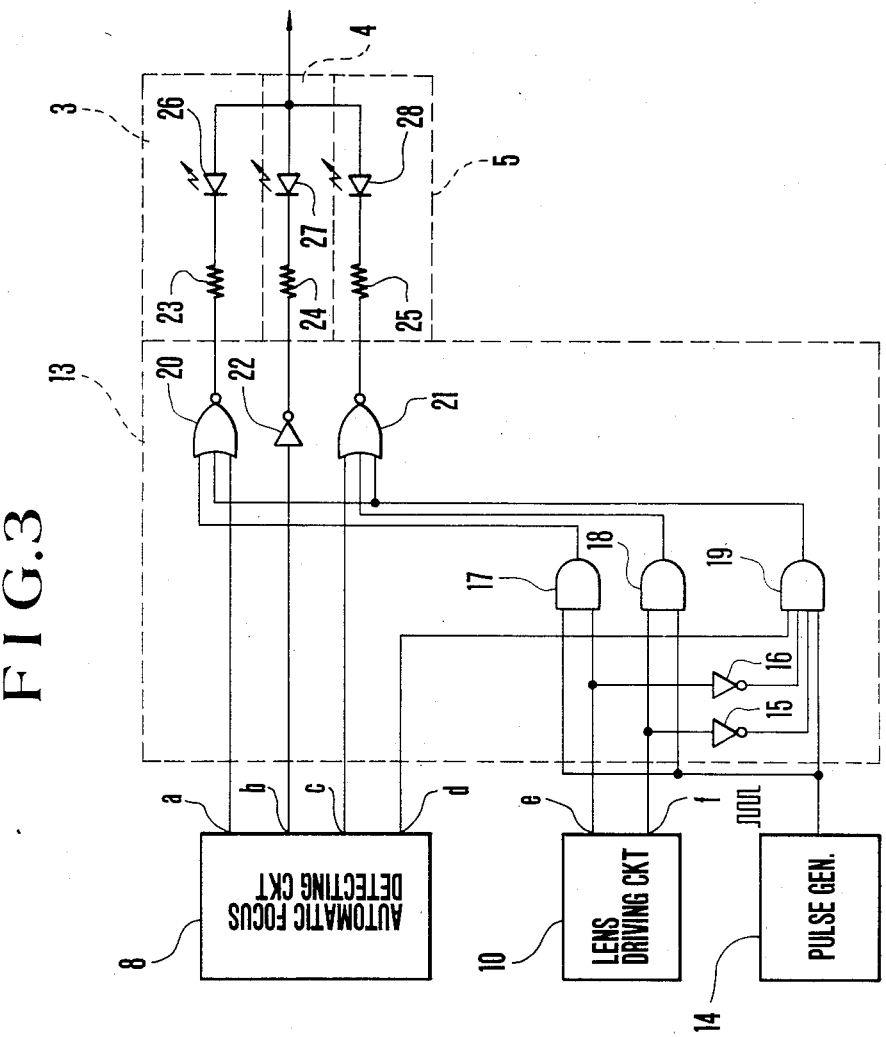
FIGS. 3, 4 and 5 are circuit diagrams showing the circuit arrangement of various blocks shown in FIG. 2.

Referring to FIG. 3 which is a circuit diagram, the automatic focus detecting circuit 8 is equipped with output terminals "a", "b", "c" and "d". A high level signal is produced from the output terminal "a" in the event of a near-focus state, from the output terminal "b" in case of an in-focus state, from the output terminal "c" in case of a far-focus state and from the output terminal "d" if automatic focus detection is impossible. The circuit 8 is thus arranged to be capable of producing a near-focus signal, an in-focus signal, a far-focus signal and a focus undetectable signal. The lens driving circuit 10 is equipped with output terminals "e" and "f". When the motor M drives the photo-taking lens 6 to shift in the drawing-in direction, a high level signal (lens draw-in signal) is produced from the output terminal "e". When the motor M drives the lens 6 to shift in the drawing-out direction, a high level signal (lens draw-out signal) is produced from the other output terminal "f" of the lens driving circuit 10.

The logic circuit 13 includes inverters 15 and 16; AND gates 17, 18 and 19; a NOR gate 20 which is arranged to receive signals from the output terminal "a" of the automatic focus detecting circuit 8 and the AND gates 17 and 19; another NOR gate 21 which is arranged to receive signals from the output terminal "c" and the AND gates 18 and 19; and an inverter 22. The display elements 3, 4 and 5 respectively comrise light quantity adjusting resistors 23, 24 and 25 and light emitting diodes 26, 27 and 28 which are arranged to make displays for the display elements 3, 4 and 5.

Figure 4:
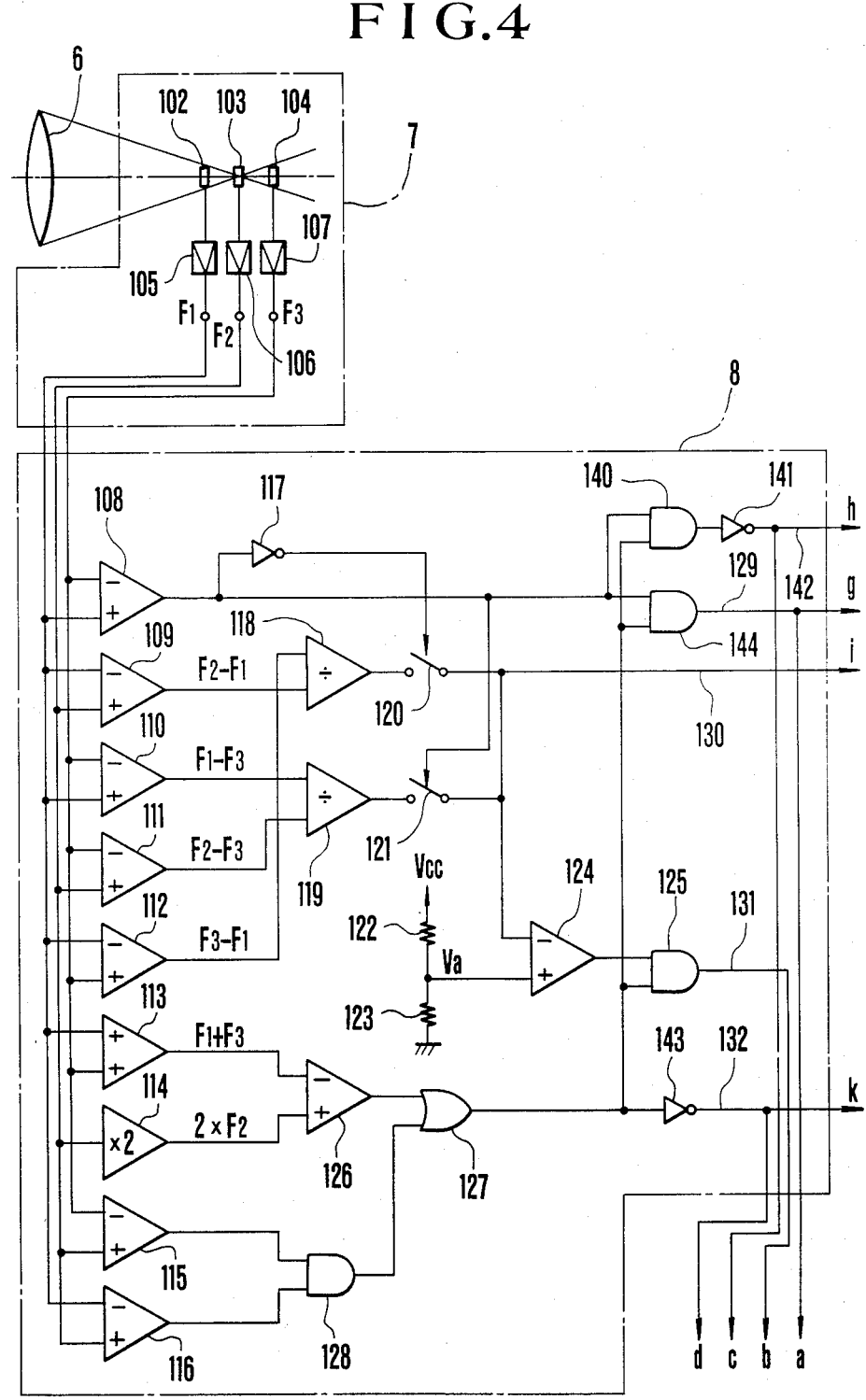

Various circuit arrangements have been known for the above-stated photo-sensitive element 7 and automatic focus detecting circuit 8. FIG. 4 shows an example of such circuit arrangement. In FIG. 4, photo-electric converting elements or the like light receiving elements 102, 103 and 104 are optically evenly spaced and disposed in front and rear of the predetermined focal plane (a film surface) of the photo-taking lens 6. The light receiving elements 102, 103 and 104 are arranged to convert the conditions of images formed on them into electrical signals. Then, processing circuits 105, 106 and 107 respectively produce sharpness signals F1, F2 and F3 which are proportional to the sharpness of the images. The circuit arrangement includes a comparator 108, differential amplifiers 109, 110, 111 and 112; an adder 113; a multiplier 114; comparators 115 and 116; inverters 117, 141 and 143; dividers 118 and 119; switches 120 and 121; voltage dividing resistors 122 and 123 which are arranged to produce a reference voltage Va by dividing power supply voltage Vcc; a comparator 124; AND gates 125, 140 and 144; another comparator 126; an OR gate 127; an AND gate 128; a near-focus indicating signal terminal 129 which produces a high level signal when a focal plane is located in front of the predetermined focal plane; a far-focus indicating signal terminal 142 which produces a high level signal when a focal plane is located in rear of the predetermined focal plane; a focusing error signal terminal 130; an in-focus zone signal terminal 131; and an effectiveness indicating signal terminal 132 which is arranged to produce an effectiveness indicating signal indicating that a focusing error signal is authentic.

Within a range having an actual focal plane in front of the predetermined focal plane, a difference (F2−F3) between the middle sharpness signal F2 and the smaller one F3 of the two end sharpness signals F1 and F3 remains unvarying over a wide range. Then, within a range having an actual focal plane in rear of the predetermined focal plane, a difference (F2−F1) between the signal F2 and the signal F1 likewise remains unvarying over a wide range. Therefore, the difference (F2−F3) or (F2−F1) is used as normalizing signal.

Where the focal plane is in front of the predetermined focal plane, the sharpness signal F1 is larger than the sharpness signal F3. Therefore, the comparator 108 produces a high level signal to turn on the switch 121. Meanwhile, a difference F1−F3 produced from the differential amplifier 110 is divided at the divider 119 by the difference F2−F3 which is produced from the differential amplifier 111. A focusing error signal (F1−F3/(F2−F3) is normalized in this manner and is produced via the switch 121 from the focusing error signal terminal 130.

When the focal plane is in the rear of the predetermined focal plane, the sharpness signal F3 becomes larger than the sharpness signal F1. In that event, the comparator 108 produces a low level signal to turn on the switch 120 via the inverter 117. Meanwhile, the divider 118 divides the difference (F3−F1) produced from the differential amplifier 112 by the difference (F2−F1) produced from the differential amplifier 109. A normalized focusing error signal (F3−F1)/(F2−F1) thus obtained is produced via the switch 120 from the focusing error signal terminal 130.

Since the focusing error signal obtained in the above-stated manner is normalized either by the difference F2−F3 or F2−F1 the value of which remains unchanged even after the sharpness signal F1 or F3 passes its peak value, the error signal excels in linearity over a wide range.

The focusing error signal on the other hand deviates from the range of the linearity and fails to give an accurate value when the focused state greatly deviates from the in-focus state. The focused state therefore must be determined whether it is within the range of the linearity. In the past, this determination has been made by finding that the middle sharpness signal F2 is larger than the end sharpness signals F1 and F3. In this embodiment, this condition F2>F1 and F2>F3 is likewise detected by means of the comparators 115 and 116 and the AND gate 128. Then, an effectiveness indicating signal is produced via the OR gate 127 and the inverter 143 from the effectiveness indicating signal terminal 132. In addition to that, for the purpose of showing effectiveness over a winder range, a condition 2×F2>(F1+F3) is arranged to be detected by means of the adder 113, the multiplier 114 and the comparator 126. Upon detection by these elements, the effectiveness indicating signal terminal 132 produces, via the OR gate 127 and the inverter 143, the effectiveness indicating signal at a low level when the focus detection is possible and at a high level when the focus is undetectable.

In displaying an in-focus zone, the focusing error signal is compared by the comparator 124 with a reference voltage Va. When the signal is lower than the reference voltage Va and yet within an effective range, the AND gate 125 allows a high level in-focus zone signal to be produced from the in-focus zone signal terminal 131.

In case the focal plane is in front of the predetermined focal plane, the comparator 108 produces a high level signal to make the output level of the near-focus indicating signal terminal 129 high. If the focal plane is to the rear of the predetermined focal plane, the comparator 108 produces a low level signal to cause the output level of the far-focus indicating signal terminal 142 to become high via the inverter 141. Further, the effectiveness indicating signal which is produced from the above-stated OR gate 127 at a high level when the focus is detectable and at a low level when the focus is undetectable is supplied to one input terminal of each of the AND gates 125, 140 and 144 to prevent thereby the in-focus zone signal, the near-focus indicating signal and the far-focus indicating signal from erroneously being produced under a distance unmeasurable condition.

The automatic focus detecting circuit 8 supplies the logic circuit 13 with the signal of the near-focus indicating signal terminal 129 from the output terminal "a"; the signal of the in-focus zone signal terminal 131 from the output terminal "b"; the signal of the far-focus indicating signal terminal 142 from the output terminal "c"; and the signal of the effectivenesss indicating signal terminal 132 from the output terminal "d".

The automatic focus detecting circuit 8 supplies the control circuit 9 with the signal of the near-focus indicating signal terminal 129 from its output terminal "g"; the signal of the far-focus indicating signal terminal 142 from its output terminal "h"; the signal of the focusing error signal terminal 130 from its output terminal "i"; and the signal of the effectiveness indicating signal terminal 132 from its output terminal "k".

Figure 5:
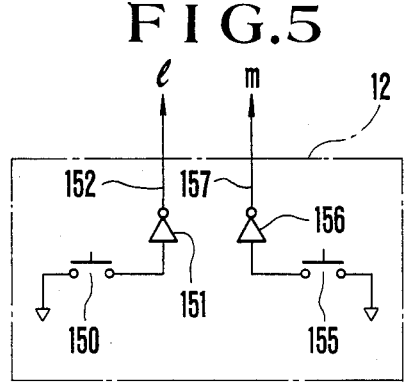

The power focusing circuit 12 shown in FIG. 2, have been embodied in the form of various known circuit arrangements. Generally, however, a push-button switch or a slide switch or the like is arranged to enable the photographer to supply the lens driving circuit 10 with a photo-taking lens draw-out or draw-in direction signal by operating the switch as necessary. FIG. 5 shows a generally adopted method of arranging the power focusing circuit 12. This circuit comprises monostable push-button switches 150 and 155 and inverters 151 and 156. The push-button switch 150 serves to cause the photo-taking lens to be driven in the drawing-out direction. The other push-button switch 155 serves to cause the lens to be driven in the drawing-in direction. When the photographer turns on the push-button switch 150, the output level of the drawing-out direction signal terminal 152 is caused to become high via the inverter 151. A high level signal thus produced is supplied from an output terminal "l" to the lens driving circuit 10. When the other push-button switch 155 is operated, it renders the output level of the drawing-in direction signal terminal 157 high via the inverter 156. A high level signal thus produced is supplied via an output terminal "m" to the lens driving circuit 10.

In the camera of the first embodiment of this invention, various kinds of operation modes are selectable. A first selectable mode is an automatic focusing mode in which the control circuit 9 controls the lens driving circuit 10 for driving the photo-taking lens 6 on the basis of the result of computation performed by the automatic focus detecting circuit 8. A second mode is an aided focusing plus power focusing mode, while a display is made on the basis of the result of computation performed by the automatic focus detecting circuit 8, the control circuit 9 in this instance does not supply the result of computation to the lens driving circuit 10; and, for driving the lens, the photographer controls the motor as desired by operating the switch of the power focusing circuit 12. A third mode is a manual plus power focusing mode. In this case, the automatic focus detecting circuit 8 remains inoperative; and the lens is driven with the power focusing circuit 12 operated by the photographer to control the motor M as desired. A fourth mode is an aided focusing mode which is possible when a manual lens is used. In that instance, while a display is achieved on the basis of the result of computation performed by the automatic focus detecting circuit 8, a focusing operation is carried out with the photo-taking lens 6 manually shifted by the photographer. In this particular mode, the lens driving direction is not discernible through the circuit arrangement.

The above-stated four modes must be freely selectable by the photographer. For this purpose, a first switch is arranged to have at least two positions shiftable from one to the other. Whether or not the lens driving circuit 10 is to be controlled on the basis of the result of computation performed by the automatic focus detection circuit 8 is determined by the control circuit 9 through the first switch. Further, a second switch is arranged to have at least two positions shiftable from one to the other. Then, whether or not the result of computation is to be supplied from the automatic focus detecting circuit 8 to the logic circuit 13 is arranged to be determined through the second switch. However, since this switch arrangement for mode selection does not relate directly to the invention, further details of the arrangement is omitted here.

In FIG. 6, the characteristic operation of the first embodiment of the invention is as follows: In FIG. 3, when a high level signal is produced from the output terminal "b" according to the result of computation performed by the automatic focus detecting circuit 8, the output level of the inverter 22 becomes low. This causes via the light quantity adjustment resistor 24 the level of the cathode side of the light emitting diode 27 to become low. As a result, the diode 27 lights up to make an in-focus display at the display element 4 within the view finder. Further, if one of the output terminals "a" and "c" produces a high level signal according to the result of computation, the output level of one of the NOR gates 20 and 21 which receives this high level signal becomes low. Then, this causes the corresponding light emitting diode 26 or 28 to light up. The display element 3 or 5 then makes a near-focus or far-focus display. Under the condition where automatic focus detection is possible, as mentioned above, one of the light emitting diodes 26, 27 and 28 is responsive to the near-focus, in-focus and far-focus signals produced from the automatic focus detecting circuit 8 lights up to have an applicable display made at one of the display elements 3, 4 and 5 (see FIG. 6).

In case the level of the output from one of the output terminals "e" and "f" of the lens driving circuit 10 becomes high, that is, for example, when a lens draw-in signal is produced from the output terminal "e" to the AND gate 17, the output of the AND gate 17 is dependent on a signal from the pulse generator 14. If the output of the pulse generator 14 is a high level signal, the AND gate 17 produces a high level signal. In that event, the output level of the NOR gate 20 becomes low to cause the light emitting diode 26 to light up. If the output of the pulse generator 14 is at a low level, the AND gate 17 produces a low level signal. At that time, if other two inputs are at a low level, the output level of the NOR gate 20 becomes high and the light emitting diode 26 does not light up. In other words, when the level of the output of the output terminal "a" of the automatic focus detecting circuit 8 and that of the AND gate 19 are low, the NOR gate 20 alternately and repeatedly produces high level and low level signals according to the cycle in which the pulse generator 14 produces its outputs. Then, the light emitting diode 26 flickers at the output producing period of the pulse generator 14 (see FIG. 6). Further, in this instance, if the output terminal "a" and the AND gate 19 produce high level signals, the light emitting diode 26 unflickeringly lights up.

When a lens draw-out signal is produced from the output terminal "f" of the lens driving circuit 10, if other inputs of the NOR gate 21 are then at low levels in the same manner as in the above-stated case of the lens draw-in signal, the light emitting diode 28 flickers. If a high level signal is produced at the output terminal "c" or from the AND gate 19, the light emitting diode 28 lights up without flickering.

Under a condition where automatic focus detection is impossible, a high level signal (a focus undetectable signal) is produced from the output terminal "d" of the automatic focus detecting circuit 8. Then, in case that both the outputs of the output terminals "e" and "f" of the lens driving circuit 10 are at low levels (when the motor M is not driven), the output of the AND gate 19 is dependent on the output of the pulse generator 14. For example, if the output of the pulse generator 14 is at a high level, the AND gate 19 produces a high level signal to the NOR gates 20 and 21. Accordingly, the levels of the outputs of both the NOR gates 20 and 21 go low to cause the light emitting diodes 26 and 28 to light up. Further, when the output level of the pulse generator 14 changes to a low level, the output level of the AND gate 19 becomes low. This causes the NOR gates 20 and 21 to produce high level outputs to put out both the light emitting diodes 26 and 28. In other words, when all the inputs of the NOR gates 20 and 21 are at low levels with the exception of the output of the AND gate 19, the light emitting diodes 26 and 28 simultaneously flicker (see FIG. 6).

FIG. 6 shows the different display states under the various photographing operation modes described above. A summary of the display operation is given as follows: With the near-focus, in-focus or far-focus signal produced at one of the output terminals "a", "b" and "c" of the automatic focus detecting circuit 8, the display element 3, 4 or 5 displays a far-focus, in-focus or rear-focus state in an unflickeringly alight state. If no signal from the automatic focus detecting circuit 8 is to be used, i.e. in the event of the power focusing mode or during a searching process, the display element 3 or 5 displays the photo-taking lens driving direction by flickering. In case the automatic focus detecting operation is impossible and the motor M is in repose, both the display elements 3 and 5 flicker at the same time. For the aided focusing plus power focusing mode, two display elements sometimes light up and flicker at the same time. In that event, while a display is made by lighting up according to the result of computation performed by the automatic focus detecting circuit 8, a flickering display is made for the purpose of informing the photographer that the photo-taking lens 6 is being actually driven. In this embodiment, with the near-focus, in-focus or far-focus signal produced from the automatic focus detecting circuit 8, the corresponding light emitting diode 26, 27 or 28 is lighted up to make an applicable display at the display element 3, 4 or 5 within the view finder; and, in addition to that, the embodiment is capable of displaying the lens driving direction during a searching process under an automatic focus detection impossible condition and also displaying the lens driving direction instructed by the photographer under the power focusing mode. Therefore, in all events, the photographer can be accurately informed of the direction in which the photo-taking lens 6 is being driven. This arrangement enables the photographer to quickly take some apposite action for seizing a shutter change. Further, the display elements 3, 4 and 5 are arranged to produce displays by unflickeringly lighting up when the photo-taking lens 6 is driven according to the signal from the automatic focus detecting circuit 8. The display elements 3 and 5 are arranged to effect displays by flickering in a searching process under an automatic focus detection impossible condition and also in case the photo-taking lens 6 is driven in the power focusing mode. Therefore, the photographing operation mode of the camera can be displayed while the direction in which the photo-taking lens 6 is being driven is also displayed, so that information on the condition of the photo-taking lens can be accurately transmitted to the photographer. Further, as will be understood from the illustration of displays to be made under the aided focusing plus power focusing mode, the embodiment simultaneously makes both an unflickeringly lighting up display and a flickering display in cases where the photographer causes the photo-taking lens 6 to be driven in an opposite direction, for example, in the lens draw-out direction from a near-focus position despite that the lens position or, for example, the near-focus position is displayed according to the result of computation performed by the automatic focus detecting circuit 8. This effectively informs the photographer of an erroneous operation. In this instance, the focusing direction is displayed by the unflickering display and the lens driving direction by the flickering display, so that difference between the two can be clearly understood.

Figure 7:
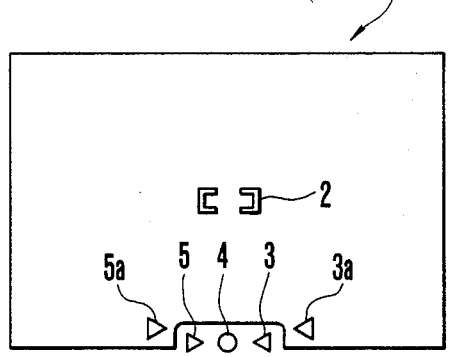
FIG. 7 shows the view finder field of a focus detecting camera arranged as a second embodiment of the invention.
Figure 8:
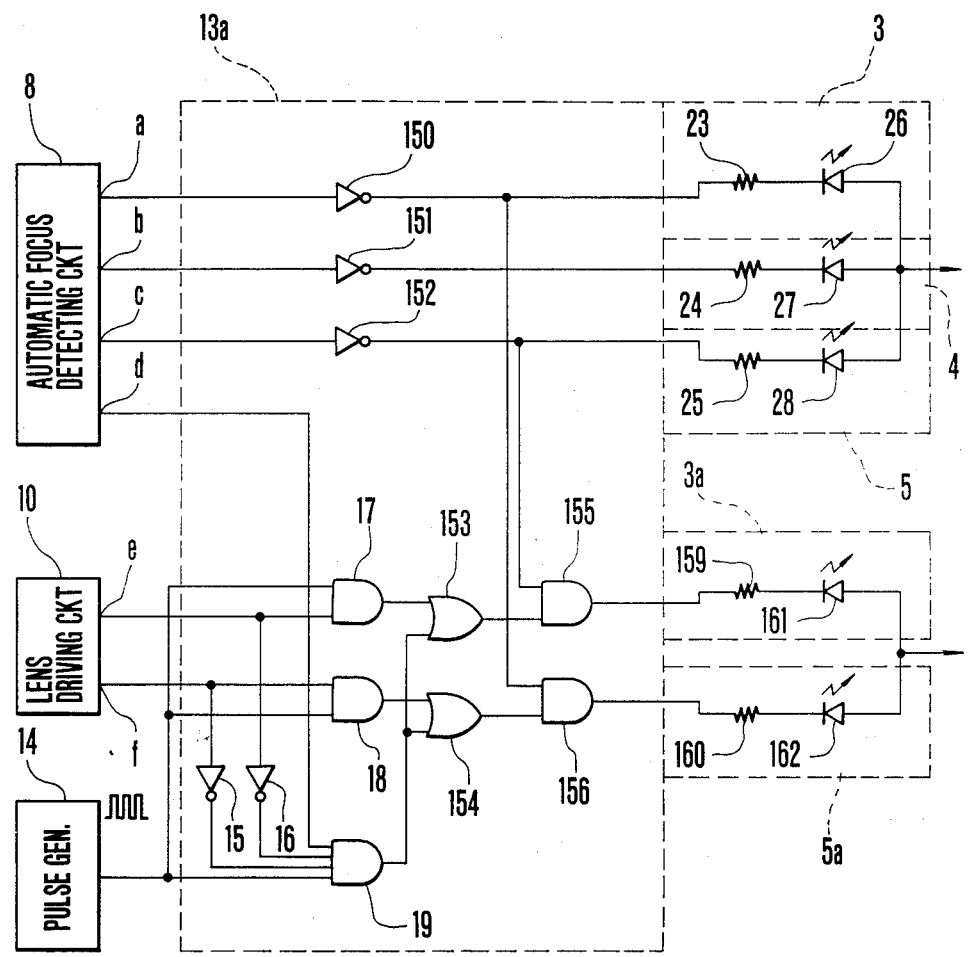
FIG. 8 is a circuit diagram showing modified circuit arrangement of the second embodiment.

FIGS. 7, 8 and 9 show a second embodiment of the invention. In this embodiment, the display elements 3, 4 and 5 are arranged in a different manner from those of the first embodiment. A difference in circuit arrangement occurs only in the logic circuit. In the description of the second embodiment, the same elements as those of the first embodiment are described with the same reference numerals and symbols. FIG. 7 shows a display arrangement which characterizes the second embodiment. The second embodiment includes an additional display element 3a which is provided for the purpose of showing that the photo-taking lens 6 is being shifted in the drawn-in direction; and another additional display element 5a which is arranged to show that the photo-taking lens 6 is being shifted in the drawn-out direction. FIG. 8 shows the logic circuit 13a which is arranged differently from that of the first embodiment for the purpose of driving the above-stated additional display elements 3a and 5a. The circuit 13a includes inverters 150, 151 and 152; OR gates 153 and 154; and AND gates 155 and 156. The display elements 3a and 5a respectively consist of light quantity adjusting resistors 159 and 160 and light emitting diodes 161 and 162. The light emitting diode 161 is arranged to make a display at the display element 3a and the light emitting diode 162 to make a display at the display element 5a. Referring also to FIG. 9, the characteristic operation of the second embodiment is as follows:

Referring to FIG. 8, where an automatic focus detecting operation is possible, the level of one of the output terminals "a", "b" and "c" of the automatic focus detecting circuit 8 becomes high according to the result of computation performed by the circuit 8. A high level signal which is thus produced is changed to a low level by the corresponding inverter 150, 151 or 152. The low level signal thus obtained causes an applicable one of the light emitting diodes 26, 27 and 28 to light up to display a far-focus, in-focus or rear-focus indication as shown in FIG. 9.

When one of the output terminals "e" and "f" of the lens driving circuit 10 comes to produce a high level signal, i.e. when, for example, a lens drawing-in signal is produced from the output terminal "e" and supplied to the AND gate 17, the AND gate 17 produces a pulse signal of the pulse generator 14. This signal is supplied via the OR gate 153 to the AND gate 155. Meanwhile, the other input terminal of the AND gate 155 receives a far-focus signal "c" via the inverter 152. Therefore, the AND gate 155 produces the above-stated pulse signal only when the lens is in a near-focus state or when the level of the output from the output terminal "d" is high under an automatic focus detection impossible condition. With the pulse signal thus produced from the AND gate 155, the light emitting diode 161 flickers as shown in FIG. 9. In this instance, if a rear-focus state has been detected by the automatic focus detecting circuit 8, the AND gate 155 closes and the light emitting diode 161 does not light up. In case that a lens drawing-out signal is produced from the output terminal "f" of the lens driving circuit 10 on the other hand, the AND gate 18 produces a pulse signal of the pulse generator 14. This signal is supplied via the OR gate 154 to the AND gate 156. Meanwhile, the other input terminal of the AND gate 156 has received a near-focus signal "a" via the inverter 150. Therefore, the AND gate 156 causes the light emitting diode 162 to flicker as shown in FIG. 9 by producing the pulse signal only when either there exists a far-focus state or the output of the output terminal "d" is at a high level. In this instance, if a near-focus state has been detected by the automatic focus detecting circuit 8, the AND gate 156 closes and the light emitting diode 162 does not light up.

In an automatic focus detection impossible condition, the output terminal "d" of the automatic focus detecting circuit 8 produces a high level signal to the AND gate 19. If at that time both the outputs of the output terminals "e" and "f" of the lens driving circuit 10 are at low levels, i.e. if the photo-taking lens 6 is in repose, the output of the AND gate 19 is dependent on the output of the pulse generator 14. As a result, both the light emitting diodes 161 and 162 flicker.

FIG. 9 summarily shows the different manners in which displays are made under various photographing operation modes. The feature of the second embodiment is as follows: With the display elements 3a and 5a added, they are arranged to separately display the state of the photo-taking lens 6 when they are being drawn out or drawn in. The effect attainable by the second embodiment is the same as the first embodiment.

Figure 10:
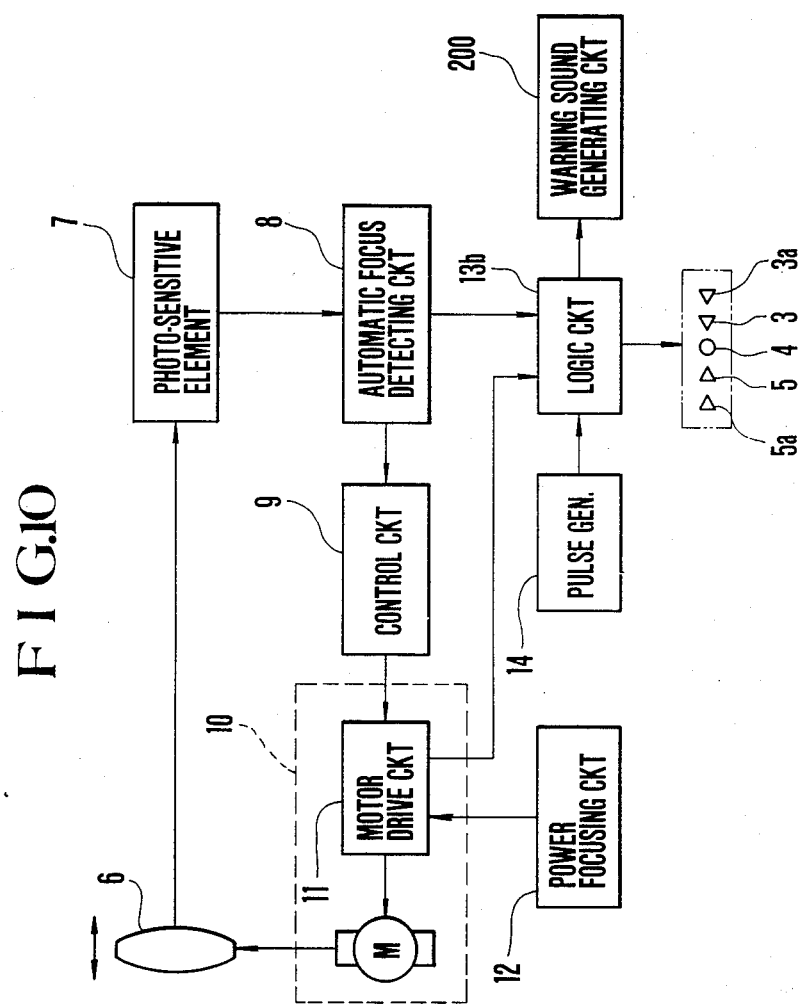
FIG. 10 is a block diagram showing the whole arrangement of a focus detecting camera arranged as a third embodiment of the invention.
Figure 11:
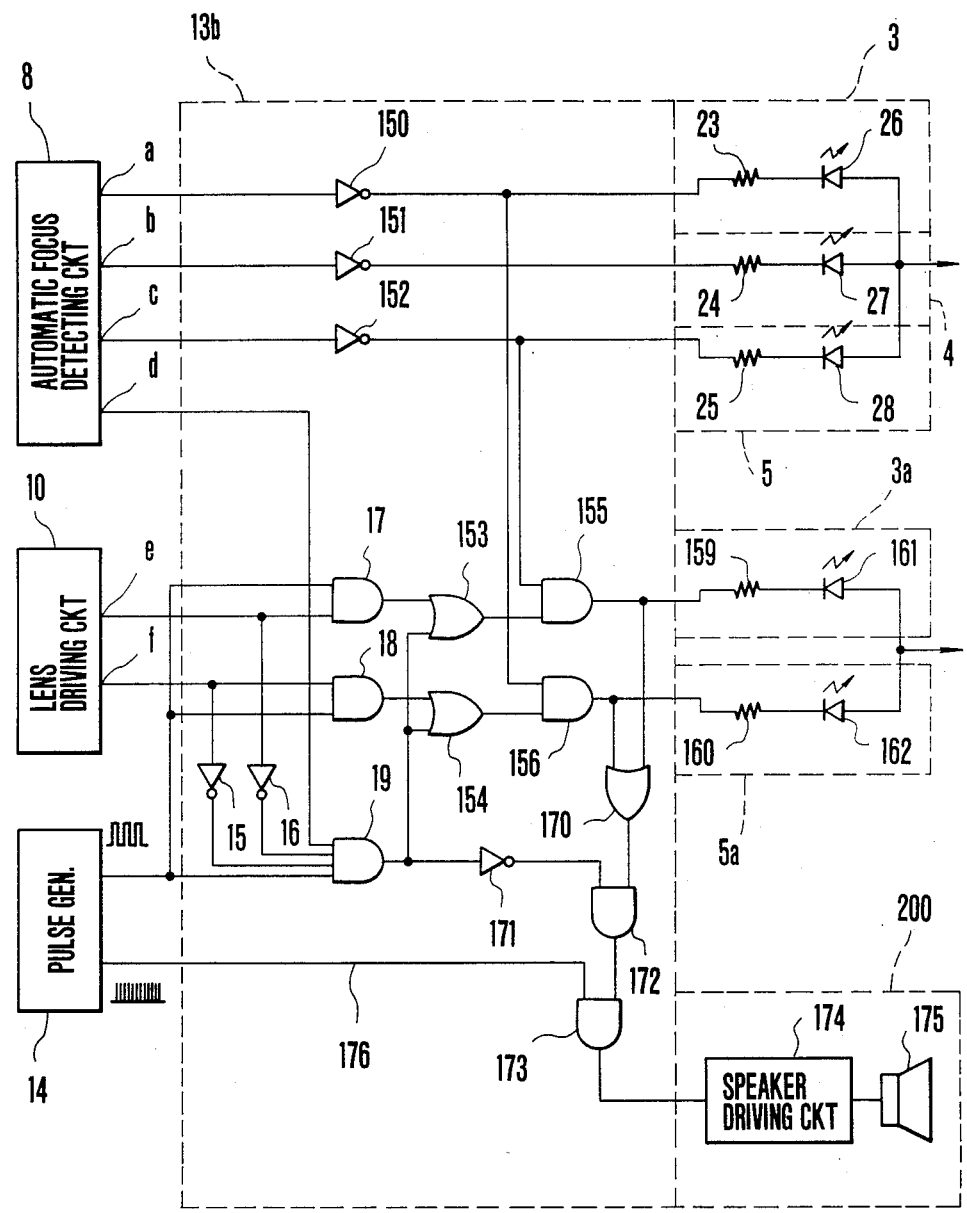
FIG. 11 is a circuit diagram showing modified circuit arrangement of the third embodiment.

Referring to FIGS. 10 and 11, a third embodiment of the invention is arranged as follows: In this embodiment, a warning sound generating circuit 200 is added and arranged to sound a warning in case the photo-taking lens 6 is driven in a direction contrary to the focusing direction under the aided focusing plus power focusing mode. The following description uses the same reference numerals for the same elements as those of the second embodiment and omits the details of them.

As shown in FIG. 10, the basic difference from the second embodiment lies in the addition of the warning sound generating circuit 200 and an incidental modification of the logic circuit 13b. FIG. 11 shows further details of the third embodiment. Newly added elements include an OR gate 170, an inverter 171, AND gates 172 and 173, a speaker driving circuit 174 and a speaker 175. A high frequency pulse signal produced for a sound forming purpose from the pulse generator 14 is introduced to an output terminal 176. The outputs of the AND gates 155 and 156 are supplied to the input terminals of the OR gate 170. The output of the OR gate 170 is supplied to the AND gate 172. Meanwhile, the other input terminal of the AND gate 172 receives the output of the AND gate 19 via the inverter 171. The output of this AND gate 172 is supplied to the AND gate 173. The other input terminal of the AND gate 173 receives the high frequency pulse signal of the pulse generator 14. The output of the AND gate 173 is supplied to the speaker driving circuit 174.

With the photo-taking lens 6 driven in the direction contrary to the focusing direction in the aided focusing plus power focusing mode, that is, for example, when the lens 6 is driven in the drawing-out direction under a near-focus condition as will be understood from FIG. 9 which shows the second embodiment, the AND gate 172 supplies the AND gate 173 with a pulse signal for driving the display element 3a. This causes the AND gate 173 to produce and supply the speaker driving circuit 174 with a pulse signal including as a component representing the above-stated sound forming high frequency signal produced from the output terminal 176. Upon receipt of the pulse signal, the circuit 174 causes the speaker 175 to sound a warning. In addition to the above-stated condition, this sound warning is also given in other instances including: An instance in which the photo-taking lens 6 is driven either in the drawing-out or -in direction when an in-focus state has been detected by the automatic focus detecting circuit 8; and another instance in which the lens 6 is driven in the drawing-in direction when a far-focus state has been detected. A feature of the third embodiment lies in the following: While the display elements 3a and 5a display driving the lens 6 in a direction contrary to the focusing direction, a sound warning is given to the photographer to shorten the length of the focusing time.

Figure 12:
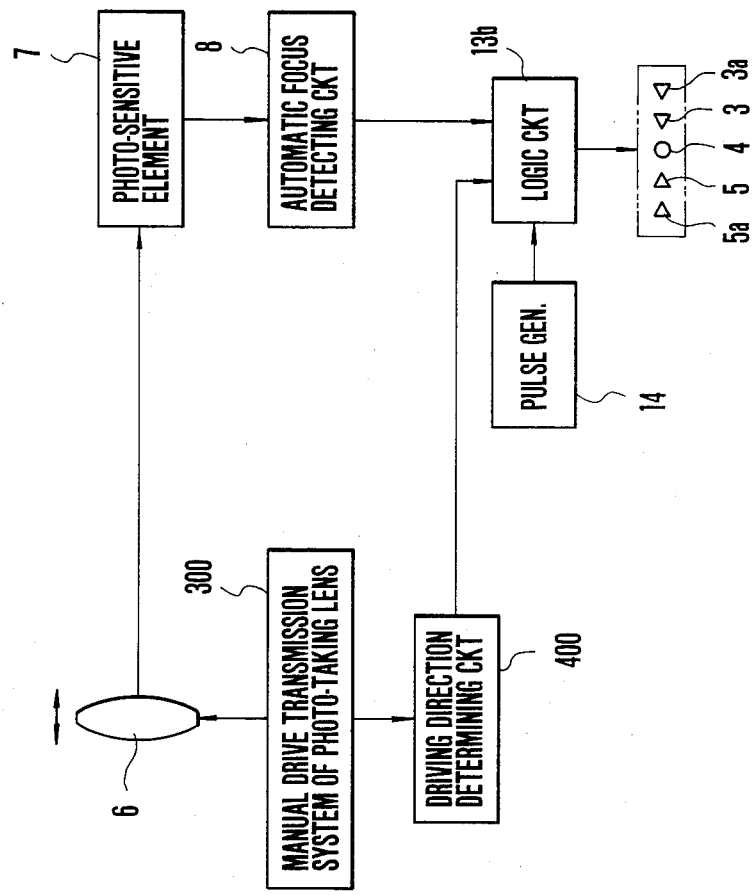
FIG. 12 is a block diagram showing the whole arrangement of a focus detecting camera arranged as a fourth embodiment of the invention.
Figure 13:
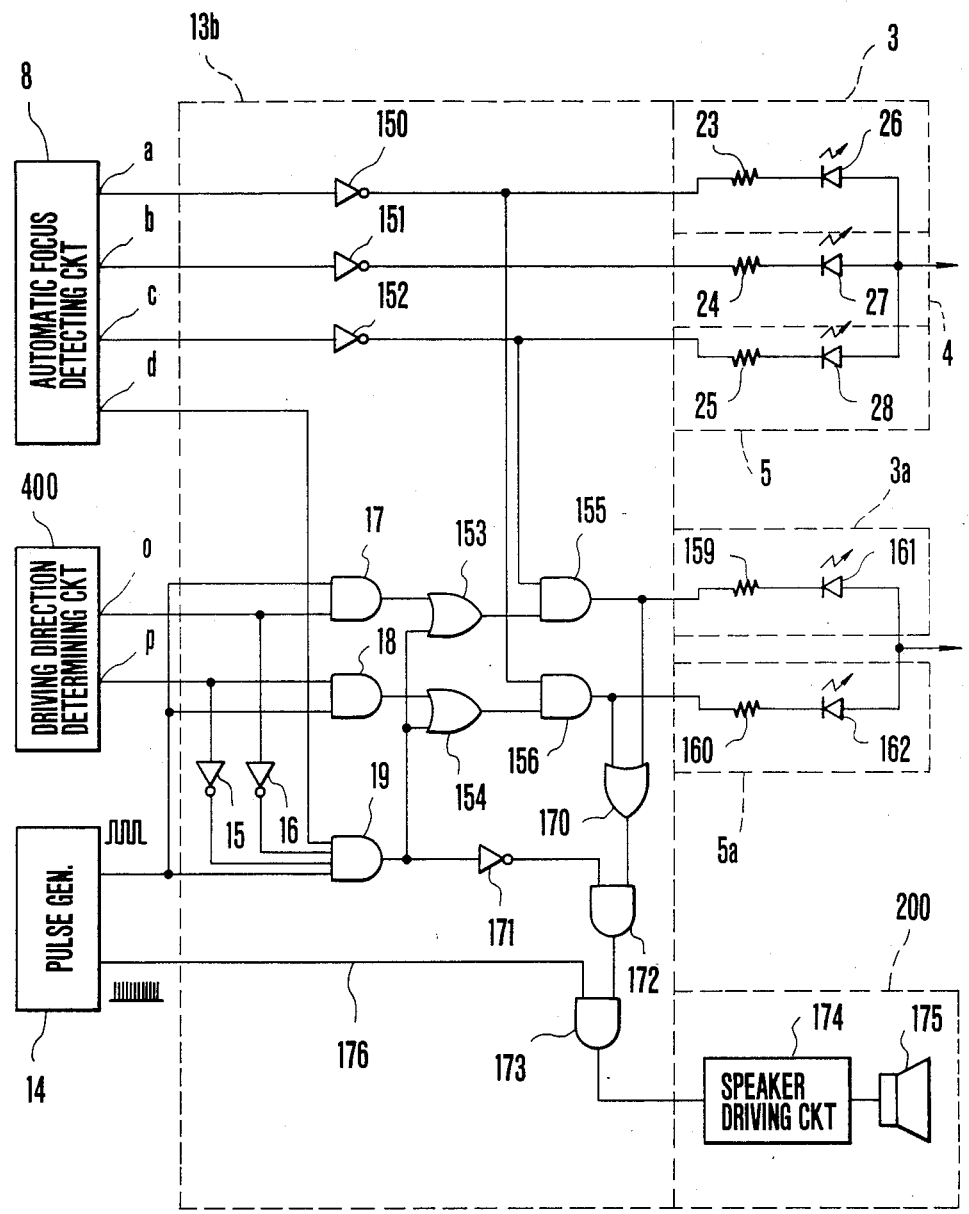
FIGS. 13 and 14 are circuit diagrams showing modified circuit arrangement of the fourth embodiment.
Figure 14:
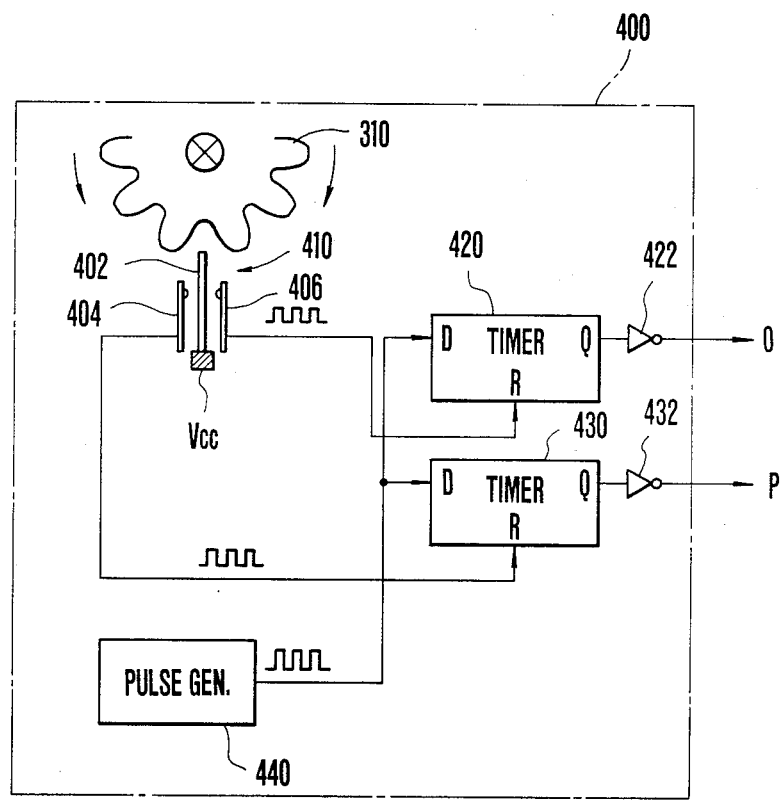

FIGS. 12 to 15 show a fourth embodiment of the invention. This embodiment is arranged to distinguish the direction in which the photo-taking lens is manually driven when a manual lens is in use in addition to the arrangement of the third embodiment. In the following description of the fourth embodiment, the same reference numerals are used for the same elements as those of the third embodiment and details of them are omitted: Referring to FIG. 12, in this case, the photo-taking lens 6 can be manually driven either in the drawing-out or -in direction by means of a known manual drive transmission system 300. A driving direction determining circuit 400 is arranged to discern the lens driving direction of the manual drive transmission system 300 and to produce and supply a determining signal representative of the direction to the logic circuit 136. Referring to FIG. 13, the logic circuit 13b may be arranged in the same manner as in the above third embodiment. The driving direction determining circuit 400 is arranged to produce a high level signal which is a lens draw-in signal produced from its output terminal "o" when the photo-taking lens 6 is being driven in the drawing-in direction and a high level signal which is a lens draw-out signal produced from another output terminal "p" when the lens 6 is driven in the drawing-out direction. The details of the driving direction determining circuit 400 are as shown in FIG. 14. The circuit 400 includes a detecting toothed wheel 310 which is arranged to turn in different directions according to the lens driving direction of the manual drive transmission system 300. In the vicinity of the teeth of the wheel 310 is provided a detecting contact arrangement 410 for detecting the turning direction of the wheel. The detecting contact arrangement 410 consists of a movable contact piece 402 of a high potential and two fixed contact pieces 404 and 406 which are disposed on both sides of the movable contact piece 402. The movable contact piece 402 is arranged to be tilted by the tips of the teeth of the wheel 310 when the detection wheel 310 turns and thus to intermittently come into contact with either of the fixed contact pieces 404 and 406 according to the turning direction of the wheel 310. The output terminals of these fixed contact pieces 404 and 406 are connected to the reset terminals R of timer circuits 420 and 430. The timer circuits 420 and 430 have data input terminals D arranged to receive a pulse signal from a pulse generator 440. When the detecting wheel 310 is not turning, that is, when the timer circuits 420 and 430 are reset and released, the output terminals Q of the timer circuits 420 and 430 produce high level signals. These high level signals are inverted by inverters 422 and 432 to keep the output terminals "o" and "p" at low levels. When a manual driving force exerted in the lens drawing-in direction causes the detecting wheel 310 to turn counterclockwise, the movable contact piece 402 intermittently comes into contact with the fixed contact piece 406 and thus applies a pulse signal to the reset terminal R of the timer circuit 420. The pulse signal keeps the output Q of the timer circuit 420 at a low level and thus the level of the output terminal "o" at a high level to allow the lens draw-in signal to be supplied to the logic circuit 13b. In case that the manual driving operation is performed in the direction of drawing out the photo-taking lens 6 to cause the detecting wheel 310 to turn clockwise, the movable contact piece 402 intermittently comes into contact with the fixed contact piece 404 to apply a pulse signal to the reset terminal R of the timer circuit 430. This keeps the level of the output Q of the timer circuit 430 low and thus makes the level of the output terminal "p" high to allow a lens draw-out signal to be supplied to the logic circuit 13b.

Referring now to FIG. 15, the characteristic operation of the fourth embodiment is as follows: In this case, the direction in which the photo-taking lens 6 is being driven can be detected even when the lens 6 is a manual lens as mentioned in the foregoing. Therefore, a manual driving operation on the photo-taking lens 6 in the direction contrary to the focusing direction in an automatic focus detectable condition with the automatic focus detecting circuit 8 and the lens driving direction under an automatic focus detection impossible condition can be displayed by the flickering of the display element 3a or 5a. For example, when the photo-taking lens 6 is manually driven in the drawing-out direction despite the fact that a near-focus state is detected by the automatic focus detecting circuit 8, the display element 5a flickers to display that the lens driving direction is contrary to the focusing direction. In addition to that, the warning sound generating circuit 200 (see FIG. 13) produces a warning sound to give a warning to the photographer. Further, where the automatic focus detecting circuit 8 is unable to automatically perform focus detection, manually driving the photo taking lens 6 in the lens' drawing-in direction, for example, the display element 3a flickers to show that.

Figure 16:
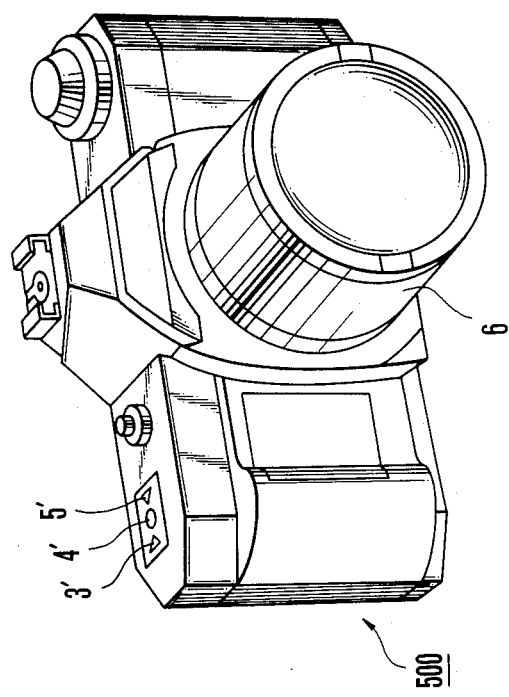
FIG. 16 is an oblique view of the appearance of a camera in which the display arrangement of the first embodiment is disposed in a different position.

FIG. 16 shows a modification of the first embodiment wherein the display elements 3, 4 and 5 of the first embodiment are disposed in a different position on the camera. While the first embodiment has these display elements 3, 4 and 5 arranged within the visual field of the view finder, this modification has display elements 3', 4' and 5' which are composed of, for example, liquid crystal display elements disposed on the upper surface of the camera body 500. These display elements are provided with the same circuit arrangement as the display elements, 3, 4 and 5 of the view finder visual field for making displays in the same manner as the latter. This modification enables the photographer to know the focused position of the photo-taking lens 6 and the lens driving direction without peeping into the view finder. It goes without saying that the allocation of the display elements of FIG. 16 is also applicable to any of other embodiments including the second, third and fourth embodiments.

As described in the foregoing, in cases where a photo-taking lens is driven in a searching process after it has been drawn out or drawn in to a position hardly permitting a focus detecting circuit to perform focus detection, the invention shortens the length of time required for a focusing operation by displaying the direction in which the lens is being driven. In the case of the first embodiment shown in FIGS. 1 to 6, the near- amnd far-focus display elements are arranged to perform combined functions of showing the photo-taking lens driving directions. This arrangement permits the lens driving directions to be displayed without necessitating an increase in the number of display elements required.

Further, in accordance with this invention, under a focus detectable condition with the focus detecting circuit, the length of time required for focusing can be shortened by a display or a sound indicating whether or not the photo-taking lens is being driven correctly in the focusing direction.

What I claim is:

1. A focus detecting device for a camera comprising:
    (a) focal point detecting means arranged to be in a focal point detectable state in which said detecting means is capable of detecting whether an object to be photographed is located in a near-focus, in-focus or far-focus position relative to the focal point of a photo-taking lens and to be in a focal point undetectable state in which said focus position is undetectable;
    (b) focal point display means for displaying a focal point on the basis of a detection signal produced by said focal point detecting means representing a near-focus, in-focus or far-focus position when said focal point detecting means is in said focal point detectable state;
    (c) photo-taking lens drive direction detecting means for detecting a lens drawing-in or drawing-out direction in which the photo-taking lens is being driven; and
    (d) photo-taking lens driving direction display means for producing a display which varies with the photo-taking lens drawing-out or drawing-in driving direction according to the direction output of said photo-taking lens driving direction detecting means and which also differs from the manner of display of said focal point display means at least when said focal point detecting means is incapable of performing focal point detection.

2. A focus detecting device for a camera according to claim 1, wherein said display means includes three discrete display elements for respectively indicating the near-focus, in-focus and far-focus positions to be displayed at said focal point display means.

3. A focus detecting device for a camera according to claim 1, wherein said driving direction display means includes two display elements which are arranged to produce displays representing different respective photo-taking lens driving directions.

4. A focus detecting device for a camera according to claim 3, wherein said two display elements of said driving direction display means are arranged to produce the displays by flickering the lights of said display elements.

5. A focus detecting device for a camera according to claim 1, 2, 3 or 4, wherein said focal point display means produces a display by lighting up unflickering while said driving direction display means produces a display by flickering.

6. A focus detecting device for a camera according to claim 1, 2, 3, or 4, wherein said focal point display means and said driving direction display means are both arranged within the visual field of a view finder.

7. A focus detecting device for a camera according to claim 1, 2, 3 or 4, wherein said focal point display means and said driving direction display means are both arranged on the exterior surface of a camera body.

8. A focus detecting device for a camera according to claim 1, further comprising:
    (a) drive stop detecting means for detecting stopping of a photo-taking lens' driving operation; and
    (b) drive stop display means for effecting a display according to a detection signal from said photo-taking lens drive stop detecting means different from the display of said photo-taking lens driving direction display means.

9. A focus detecting device for a camera according to claim 1, further comprising:
    an electric motor arranged to drive said photo-taking lens to draw out and draw in.

10. A focus detecting device for a camera according to claim 9, wherein the direction in which said photo-taking lens is being driven is arranged to be distinguished by means for detecting the direction of power supplied for the forward or backward rotation of said electric motor.

11. A focus detecting device for a camera according to claim 1, further comprising:
    a manual drive transmission system for driving said photo-taking lens to draw out and to draw in.

12. A focus detecting device for a camera according to claim 11, wherein further comprising a drive direction determining current for distinguishing the drive direction of the photo-taking lens, said drive direction determining circuit being arranged to detect the turning direction of a toothed wheel of said manual drive transmission system.

13. A focus detecting device for a camera according to claim 5, wherein said focal point display means and said driving direction display means are both arranged within the visual field of a view finder.

14. A focus detecting device for a camera according to claim 5, wherein said focal point display means and said driving direction display means are both arranged on the exterior surface of a camera body.

15. A focus detecting device for a camera according to claim 1, in which at least a part of display elements of said focal point display means and said driving direction means are commonly used.

16. A focus detecting device for a camera comprising:
    (a) focal point detecting means arranged to be in a first state in which said detecting means is capable of detecting whether an object to be photographed is located in a near-focus, in-focus or far-focus position relative to the focal point of a photo-taking lens and to be in a second state in which said focus position is undetectable;
    (b) focal point display means for displaying a focal point on the basis of a detection signal produced by said focal point detecting means and representing a near-focus, in-focus or far-focus position when said focal point detecting means is in the first state;

(c) photo-taking lens drive direction detecting means for detecting a lens drawing-in or drawing-out direction in which the photo-taking lens is being driven; and (d) photo-taking lens driving direction display means for effecting a display in place of said focal point display means in a manner which varies with the photo-taking lens drawing-out or drawing-in driving direction according to the detection output of said photo-taking lens driving direction detecting means and which also differs from the manner of display manner of said focal point display means when said focal point detecting means is in the second state.

17. A focus detecting device for a camera comprising:
(a) focal point detecting means for detecting that an object to be photographed is located in a near-focus, in-focus position, or far-focus position relative to a focal point of a photo-taking lens;
(b) photo-taking lens driving direction detecting means for detecting a drawing-in or drawing-out direction in which the photo-taking lens is being driven; and
(c) informing means for informing a photographer that the lens driving direction detected by said photo-taking lens driving direction detecting means is contrary to a focusing direction relative to the focal point detected by said focal point detecting means.

18. A focus detecting device for a camera according to claim 17, wherein said forming means is arranged to inform with a display formed by a display device.

19. A focus detecting device for a camera according to claim 18, wherein said display device is arranged within the visual field of a view finder.

20. A focus detecting device for a camera according to claim 18, wherein said display device is arranged on the exterior surface of a camera body.

21. A focus detecting device for a camera according to claim 17, wherein said informing means is arranged to inform with an informing sound produced by an informing sound generating circuit.

22. A focus detecting device for a camera according to claim 17, wherein said informing means is arranged to inform with a display made by a display device in combination with an informing sound produced by an informing sound generating circuit.

23. A focus detecting device for a camera according to claim 17, further comprising:
an electric motor arranged to drive said photo-taking lens to draw out and draw in.

24. A focus detecting device for a camera according to claim 23, wherein a direction in which said photo-taking lens is being driven is arranged to be distinguished by detecting the direction of power supply effected for the forward or backward rotation of said electric power.

25. A focus detection device for a camera according to claim 17, further comprising:
a manual drive transmission system for driving said photo-taking lens to draw out and to draw in.

26. A focus detection device for a camera according to claim 25, wherein the photo-taking lens driving direction is arranged to be distinguished by a driving direction determining circuit which detects the turning direction of a toothed wheel of said manual drive transmission system.

27. A focus detecting device for a camera comprising:
(a) focal point detecting means arranged to detect that an object to be photographed is located in a near-focus, in-focus or far-focus position relative to the focal point of a photo-taking lens;
(b) focal point display means for displaying a focal point on the basis of a detection signal produced by said focal point detecting means representing a near-focus, in-focus or far-focus position;
(c) photo-taking lens driving direction detecting means for detecting a drawing-in or drawing-out direction in which the photo-taking lens is being driven; and
(d) informing means for informing and displaying in a manner different from the displaying manner of said focal point display means that the lens driving direction detected by said photo-taking lens driving direction detecting means is contrary to a focusing direction relative to the focal point detected by said focal point detecting means.

* * * * *